United States Patent
Asami et al.

(10) Patent No.: US 7,925,406 B2
(45) Date of Patent: Apr. 12, 2011

(54) CONTROL APPARATUS FOR VEHICLE AND METHOD OF CONTROLLING VEHICLE

(75) Inventors: Tomohiro Asami, Nisshin (JP); Toshio Sugimura, Nagoya (JP); Takaaki Tokura, Nagoya (JP); Nobufusa Kobayashi, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 428 days.

(21) Appl. No.: 11/879,507

(22) Filed: Jul. 18, 2007

(65) Prior Publication Data

US 2008/0040010 A1 Feb. 14, 2008

(30) Foreign Application Priority Data

Aug. 10, 2006 (JP) ................................. 2006-218679

(51) Int. Cl.
  *G06F 7/00* (2006.01)
  *G06F 17/00* (2006.01)
  *B60W 10/04* (2006.01)
  *B60W 10/10* (2006.01)
(52) U.S. Cl. ......................................... 701/51; 477/107
(58) Field of Classification Search .................... 701/51, 701/55
See application file for complete search history.

(56) References Cited

U.S. PATENT DOCUMENTS

| 2001/0021682 A1* | 9/2001 | Urasawa ............................ 477/3 |
| 2002/0022549 A1* | 2/2002 | Saito et al. ...................... 477/143 |
| 2003/0109357 A1* | 6/2003 | Tabata ........................... 477/109 |
| 2003/0233185 A1* | 12/2003 | Takebayashi et al. ........... 701/55 |

FOREIGN PATENT DOCUMENTS

| JP | A-2001-248466 | 9/2001 |
| JP | A-2004-245327 | 9/2004 |
| JP | A 2004-314842 | 11/2004 |

OTHER PUBLICATIONS

U.S. Appl. No. 11/879,513, filed Jul. 18, 2007 in the name of Tomohiro Asami et al.
U.S. Appl. No. 11/879,515, filed Jul. 18, 2007 in the name of Tomohiro Asami et al.
U.S. Appl. No. 11/879,502, filed Jul. 18, 2007 in the name of Tomohiro Asami et al.

* cited by examiner

*Primary Examiner* — Tuan C To
*Assistant Examiner* — Imran Mustafa
(74) *Attorney, Agent, or Firm* — Oliff & Berridge, PLC

(57) ABSTRACT

A first input torque value estimated when it is determined that an inertia phase has started is stored as an input torque value. Then, the input torque value is updated to a value determined based on the first input torque value and a second input torque value estimated when it is determined that the accelerator pedal has been operated by at least a predetermined amount. When the second input torque value is smaller than the first input torque value, the stored input torque value is updated to a value that is equal to or greater than the first input torque value. When the second input torque value is equal to or greater than the first input torque value, the stored input torque value is updated to the second input torque value.

8 Claims, 8 Drawing Sheets

FIG.3

|      | C1 | C2 | B1 | B2 | B3 | F |
|------|----|----|----|----|----|----|
| 1ST  | ○ | × | × | ◎ | × | △ |
| 2ND  | ○ | × | ○ | × | × | × |
| 3RD  | ○ | × | × | × | ○ | × |
| 4TH  | ○ | ○ | × | × | × | × |
| 5TH  | × | ○ | × | × | ○ | × |
| 6TH  | × | ○ | ○ | × | × | × |
| R    | × | × | × | ○ | ○ | × |
| N    | × | × | × | × | × | × |

○ ENGAGED
× DISENGAGED
◎ ENGAGED WHEN ENGINE BRAKE IS APPLIED
△ ENGAGED ONLY WHEN ENGINE DRIVES WHEELS

US 7,925,406 B2

CONTROL APPARATUS FOR VEHICLE AND METHOD OF CONTROLLING VEHICLE

INCORPORATION BY REFERENCE

The disclosure of Japanese Patent Application No. 2006-218679 filed on Aug. 10, 2006, including the specification, drawings and abstract is incorporated herein by reference in its entirety.

BACKGROUND OF THE INVENTION

1. Field of the Invention

The invention relates to a control apparatus for a vehicle, and a method of controlling a vehicle. More specifically, the invention relates to a technology in which torque output from a power source is boosted during a torque phase when an automatic transmission upshifts.

2. Description of the Related Art

When an automatic transmission upshifts, a driving force decreases during a torque phase, and then the driving force increases and a shock occurs when the torque phase ends and an inertia phase starts. To suppress the shock when the automatic transmission shifts, the technology in which the torque is boosted during the torque phase, and the torque is decreased during the inertia phase is proposed.

Japanese Patent Application Publication No. 2004-314842 (JP-A-2004-314842) describes a shift control apparatus for an automatic transmission. When a gear shift is performed by engaging a friction element, the shift control apparatus executes an engaging-capacity control for the friction element and a torque decrease control that decreases torque output from a power source to reduce a shift shock during an inertia phase in which an effective gear ratio, which is the ratio of a rotational speed input to the automatic transmission to a rotational speed output from the automatic transmission, changes from a pre-shift gear ratio to a post-shift gear ratio. The shift control apparatus described in the above publication corrects the engaging capacity of the friction element based on the difference between a target power source torque that should be achieved by the torque decrease control, and the lower limit value of the power source torque. Also, the shift control apparatus executes a torque-boost control during a torque phase immediately before the inertia phase.

The shift control apparatus described in the above publication corrects the engaging capacity of the friction element through a feed-forward control to compensate for insufficiency in torque decrease because of the lower limit value of the power source torque. Because the engaging capacity of the friction element is corrected through the feed-forward control, it is possible to avoid a problem relating to slow response, which would arise if the engagement pressure is corrected through a feedback control. Thus, it is possible to reduce the difference in the output torque before and after the gear shift.

The engagement pressure (engaging capacity) is controlled based on the torque input to the automatic transmission during the inertia phase. Accordingly, if an accelerator pedal is operated during the inertia phase, the engagement pressure may be increased as the torque output from the power source, that is, the torque input to the automatic transmission increases. However, because the shift control apparatus described in the above publication executes the torque decrease control that decreases the torque output from the power source during the inertia phase, the torque input to the automatic transmission may decrease when an accelerator-pedal operation amount increases. If the engagement pressure is decreased based on the decreased torque input to the automatic transmission, the gear shift is slowly performed.

SUMMARY OF THE INVENTION

A first aspect of the invention relates to a control apparatus for a vehicle that includes a power source, and an automatic transmission connected to the power source, in which a gear is selected from among a plurality of gears with different gear ratios by selectively engaging a plurality of friction engagement elements. The control apparatus includes a torque-boost control portion, an inertia-phase determination portion, an operation determination portion, an input-torque estimation portion, an input-torque storage portion, and an engagement-pressure control portion. The torque-boost control portion boosts torque output from the power source during a torque phase when the automatic transmission upshifts. The inertia-phase determination portion determines whether an inertia phase has started when the automatic transmission upshifts. The operation determination portion determines whether an accelerator pedal has been operated by at least a predetermined amount. The input-torque estimation portion estimates an input torque value that is the value of torque input to the automatic transmission. The input-torque storage portion stores, as the input torque value, a first input torque value that is estimated when it is determined that the inertia phase has started, and then updates the input torque value to a value determined based on the first input torque value and a second input torque value that is estimated when it is determined that the accelerator pedal has been operated by at least the predetermined amount. The engagement-pressure control portion controls an engagement pressure for a friction engagement element to be engaged when the automatic transmission upshifts, based on the stored input torque value. When the second input torque value is smaller than the first input torque value, the input-torque storage portion updates the stored input torque value to a value that is equal to or greater than the first input torque value. When the second input torque value is equal to or greater than the first input torque value, the input-torque storage portion updates the stored input torque value to the second input torque value.

According to the first aspect, it is possible to reduce the possibility that the input torque value used to control the engagement pressure for the friction engagement element decreases after the inertia phase starts. Therefore, it is possible to reduce the possibility that the engagement pressure for the friction engagement element decreases when the accelerator pedal has been operated. As a result, it is possible to provide the control apparatus for the vehicle, which reduces the possibility that the gear shift is slowly performed.

A second aspect of the invention relates to a method of controlling a vehicle that includes a power source, and an automatic transmission connected to the power source, in which a gear is selected from among a plurality of gears with different gear ratios by selectively engaging a plurality of friction engagement elements. The method includes boosting torque output from the power source during a torque phase when the automatic transmission upshifts; determining whether an inertia phase has started when the automatic transmission upshifts; determining whether an accelerator pedal has been operated by at least a predetermined amount; estimating an input torque value that is the value of torque input to the automatic transmission; storing, as the input torque value, a first input torque value that is estimated when it is determined that the inertia phase has started, and then updating the input torque value to a value determined based on the first input torque value and a second input torque value that is estimated when it is determined that the accelerator pedal has been operated by at least the predetermined amount; and controlling an engagement pressure for a friction engagement element to be engaged when the automatic transmission upshifts, based on the stored input torque value. When the second input torque value is smaller than the first input torque value, the stored input torque value is updated to a value that is equal to or greater than the first input torque value. When the second input torque value is equal to or greater than the first input torque value, the stored input torque value is updated to the second input torque value.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a diagram showing an operation table for the automatic transmission;

DETAILED DESCRIPTION OF THE EXAMPLE EMBODIMENTS

Figure 1:
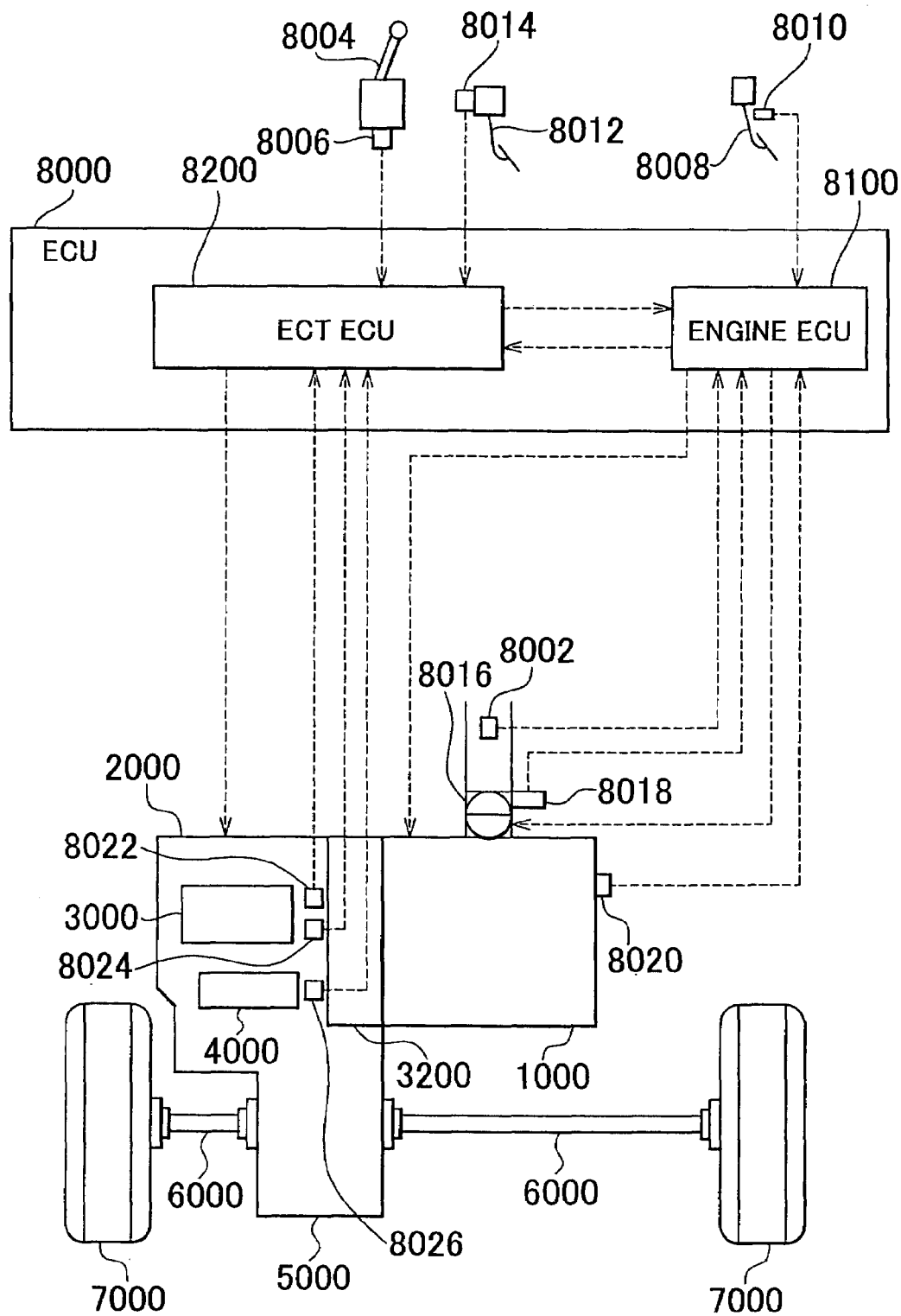
FIG. 1 is a schematic diagram showing the configuration of the power train of a vehicle.

Hereinafter, embodiments of the invention will be described with reference to the drawings. In the following description, the same and corresponding components are denoted by the same reference numerals, and have the same names and the same functions. Therefore, the detailed description thereof will not be repeated.

A vehicle provided with a control apparatus according to a first embodiment of the invention will be described with reference to FIG. 1. The vehicle is a front-engine front-drive vehicle. The control apparatus according to the invention may be provided in a vehicle other than the front-engine front-drive vehicle.

The vehicle includes an engine 1000, an automatic transmission 2000; a planetary gear unit 3000 that constitutes a part of the automatic transmission 2000; a hydraulic circuit 4000 that constitutes a part of the automatic transmission 2000; a differential gear 5000; a drive shaft 6000; front wheels 7000; and an ECU (Electronic Control Unit) 8000. The control apparatus according to the embodiment may be implemented, for example, by executing a program stored in the ROM (Read Only Memory) of the ECU 8000.

The engine 1000 is an internal combustion engine in which mixture of air and fuel injected from an injector (not shown) is burned in the combustion chamber of each cylinder. A piston is pushed down in the cylinder by combustion, and thus a crankshaft is rotated. Instead of, or in addition to the engine 1000, a motor may be employed as a power source.

The automatic transmission 2000 is connected to the engine 1000 via a torque converter 3200. When a desired gear is selected in the automatic transmission 2000, the rotational speed of the crankshaft input to the automatic transmission 2000 changes to the desired rotational speed.

The output gear of the automatic transmission 2000 engages with the differential gear 5000. The differential gear 5000 is connected to a drive shaft 6000, for example, using a spline. Power is transmitted to the front right and front left wheels 7000 via the drive shaft 6000.

The ECU 8000 is connected to an airflow meter 8002, a position switch 8006 for a shift lever 8004, an accelerator-pedal operation amount sensor 8010 for an accelerator pedal 8008, a brake-pedal force sensor 8014 for a brake pedal 8012, a throttle-valve opening amount sensor 8018 for an electronic throttle valve 8016, an engine speed sensor 8020, an input-shaft rotational speed sensor 8022, an output-shaft rotational speed sensor 8024, and an oil-temperature sensor 8026, for example, via harness.

The airflow meter 8002 detects the amount of air taken into the engine 1000 (hereinafter, will be sometimes referred to as "intake air amount"), and transmits a signal that indicates the detected intake air amount to the ECU 8000. The position switch 8006 detects the position of the shift lever 8004, and transmits a signal that indicates the detected shift lever position to the ECU 8000. The gear is automatically selected in the automatic transmission 2000, according to the position of the shift lever 8004. A manual shift mode may also be selected. When the manual shift mode is selected, a driver may select any gear by manual operation.

The accelerator-pedal operation amount sensor 8010 detects the operation amount of the accelerator pedal 8008 (hereinafter, referred to as "accelerator-pedal operation amount"), and transmits a signal that indicates detected accelerator-pedal operation amount to the ECU 8000. The brake-pedal force sensor 8014 detects the force applied to the brake pedal 8012, and transmits a signal that indicates the detected force to the ECU 8000.

The throttle-valve opening amount sensor 8018 detects the opening amount of the electronic throttle valve 8016, and transmits a signal that indicates the detected opening amount to the ECU 8000. The opening amount of the electronic throttle valve 8016 is adjusted by an actuator. The electronic throttle valve 801.6 adjusts the amount of air taken into the engine 1000 (i.e., output from the engine 1000).

The amount of air taken into the engine 1000 may be adjusted by adjusting the lifts of an intake valve (not shown) and an exhaust valve (not shown), or the rotational phases for opening/closing the intake valve and exhaust valve, instead of, or in addition to operating the electronic throttle valve 8016.

The engine speed sensor 8020 detects the rotational speed of the crankshaft of the engine 1000, and transmits a signal that indicates the detected crankshaft speed to the ECU 8000. The input-shaft rotational speed sensor 8022 detects the rotational speed NI of the input shaft of the automatic transmission 2000 (i.e., the rotational speed NT of the turbine of the torque converter 3200), and transmits a signal that indicates the detected input shaft speed to the ECU 8000. The output-shaft rotational speed sensor 8024 detects the rotational speed NO of the output shaft of the automatic transmission 2000, and transmits a signal that indicates the detected output shaft speed to the ECU 8000.

The oil-temperature sensor 8026 detects the temperature of automatic transmission fluid (ATF), used for operating and lubricating the automatic transmission 2000, and transmits the detected ATF temperature to the ECU 8000.

The ECU 8000 controls devices so that the vehicle moves in a desired state, based on the signals transmitted from the airflow meter 8002, position switch 8006, accelerator-pedal operation amount sensor 8010, brake-pedal force sensor 8014, throttle-valve opening amount sensor 8018, engine speed sensor 8020, input-shaft rotational speed sensor 8022, output-shaft rotational speed sensor 8024, oil-temperature sensor 8026, and the like, and maps and programs stored in the ROM (Read Only Memory).

In this embodiment, when the shift lever 8004 is in D (Drive), and accordingly the D (Drive) range is selected in the automatic transmission 2000, the ECU 8000 controls the automatic transmission 2000 so that one of a first gear to a sixth gear is selected. When one of the first gear to the sixth gear is selected, the automatic transmission 2000 transmits driving force to the front wheels 7000. In the D range, at least one higher gear than the sixth gear may be provided. That is, for example, a seventh gear and an eighth gear may be provided. The gear is selected based on a shift diagram that is made in advance, for example, empirically. In the shift diagram, the vehicle speed and accelerator-pedal operation amount are used as parameters.

As shown in FIG. 1, the ECU 8000 includes an engine ECU 8100 that controls the engine 1000, and an ECT (Electronic Controlled Transmission)_ECU 8200 that controls the automatic transmission 2000.

The engine ECU 8100 transmits/receives signals to/from the ECT_ECU 8200. In this embodiment, the engine ECU 8100 transmits the signal that indicates the accelerator-pedal operation amount and the signal that indicates torque output from the engine 1000 to the ECT_ECU 8200. The ECT_ECU 8200 transmits the signal that indicates a requested torque amount that is defined as "torque that needs to be output from the engine 1000" to the engine ECU 8100.

Figure 2:
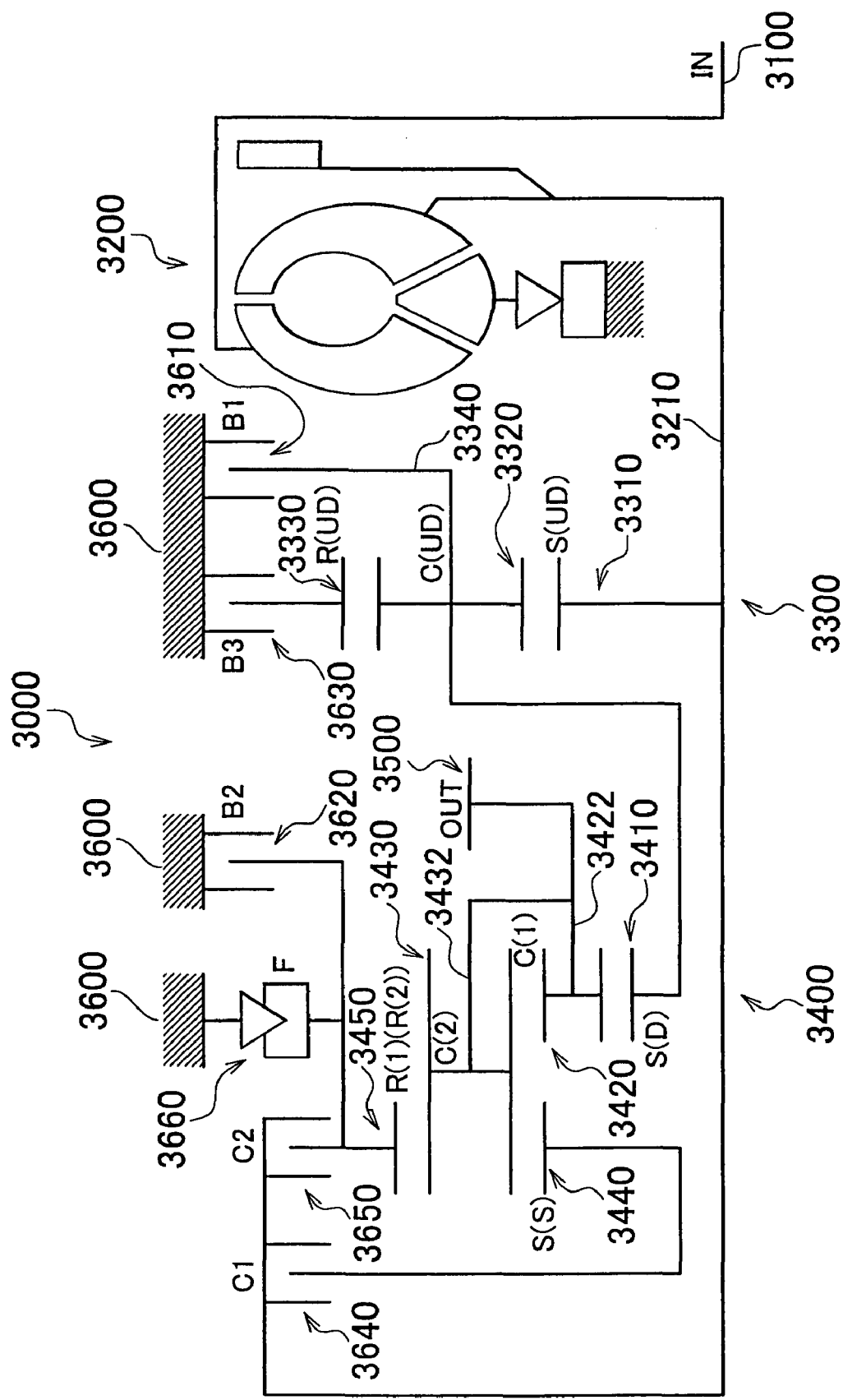
FIG. 2 is a skeleton diagram showing the planetary gear unit of an automatic transmission.

The planetary gear unit 3000 will be described with reference to FIG. 2. The planetary gear unit 3000 is connected to the torque converter 3200 that includes the input shaft 3100 connected to the crankshaft. The planetary gear unit 3000 includes a first planetary gear set 3300, a second planetary gear set 3400, an output gear 3500, a B1 brake 3610, a B2 brake 3620, and a B3 brake 3630, a C1 clutch 3640 and a C2 clutch 3650, and a one-way clutch F3660. The B1 brake 3610, B2 brake 3620, and B3 brake 3630 are fixed to the gear case 3600.

The first planetary gear set 3300 is a single pinion type planetary gear mechanism. The first planetary gear set 3300 includes a sun gear S (UD) 3310, a pinion 3320, a ring gear R (UD) 3330, and a carrier C (UD) 3340.

The sun gear S (UD) 3310 is connected to the output shaft 3210 of the torque converter 3200. The pinion 3320 is rotatably supported by the carrier C (UD) 3340. The pinion 3320 engages with the sun gear S (UD) 3310 and ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second planetary gear set 3400 is a Ravigneaux type planetary gear mechanism. The second planetary gear set 3400 includes a sun gear S (D) 3410, a short pinion 3420, a carrier C (1) 3422, a long pinion 3430, a carrier C (2) 3432, a sun gear S (S) 3440, and a ring gear R (1) (R (2)) 3450.

The sun gear S (D) 3410 is connected to the carrier C (UD) 3340. The short pinion 3420 is rotatably supported by the carrier C (1) 3422. The short pinion 3420 engages with the sun gear S (D) 3410, and long pinion 3430. The carrier C (1) 3422 is connected to the output gear 3500.

The long pinion 3430 is rotatably supported by the carrier C (2) 3432. The long gear 3430 engages with the short pinion 3420, sun gear S (S) 3440, and ring gear R (1) (R (2)) 3450. The carrier C (2) 3432 is connected to the output gear 3500.

The sun gear S (S) 3440 is connected to the output shaft 3210 of the torque converter 3200 by the C1 clutch 3640. The ring gear R (1) (R (2)) 3450 is fixed to the gear case 3600 by the B2 brake 3620, and connected to the output shaft 3210 of the torque converter 3200 by the C2 clutch 3650. The ring gear R (1) (R (2)) 3450 is connected to the one-way clutch F3660. When the engine drives the wheels in the first gear, the ring gear R (1) (R (2)) 3450 is prevented from rotating.

The one-way clutch F3660 is provided in parallel with the B2 brake 3620. That is, the outer race of the one-way clutch F3660 is fixed to the gear case 3600. The inner race of the one-way clutch F3660 is connected to the ring gear R (1) (R (2)) 3450 via a rotation shaft.

FIG. 3 is an operation table that shows the relation between the gears and the operating states of the clutches and brakes. By operating the brakes and clutches as shown in the operation table, one of the first gear to the sixth gear, and a reverse gear is selected.

Figure 4:
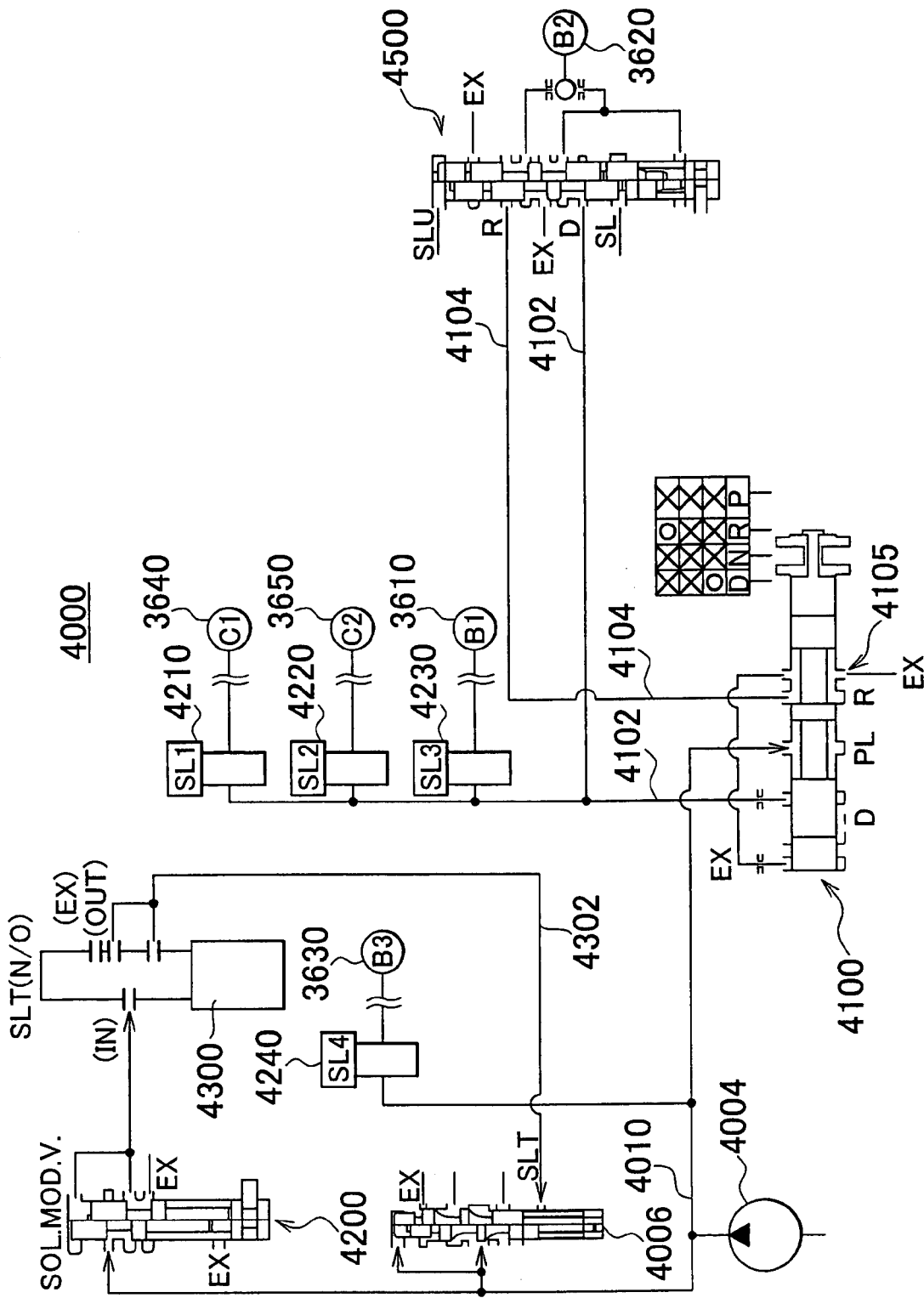
FIG. 4 is a diagram showing the hydraulic circuit of the automatic transmission.

As shown in FIG. 4, the main part of the hydraulic circuit 4000 will be described. The hydraulic circuit 4000 is not limited to the circuit described below.

The hydraulic circuit 4000 includes an oil pump 4004, a primary regulator valve 4006, a manual valve 4100, a solenoid modulator valve 4200, an SL1 linear solenoid (hereinafter, simply referred to as SL (1)) 4210, an SL2 linear solenoid (hereinafter, simply referred to as SL (2)) 4220, an SL3 linear solenoid (hereinafter, simply referred to as SL (3)) 4230, an SL4 linear solenoid (hereinafter, simply referred to as SL (4)) 4240, an SLT linear solenoid (hereinafter, simply referred to as SLT) 4300, and a B2 control valve 4500.

The oil pump 4004 is connected to the crankshaft of the engine 1000. By rotating the crankshaft, the oil pump 4004 generates a hydraulic pressure. The primary regulator valve 4006 regulates the hydraulic pressure generated by the oil pump 4004, which is the source pressure, to a line pressure.

The primary regulator valve 4006 is operated by a throttle pressure that functions as a pilot pressure. The SLT 4300 regulates a solenoid modulator pressure to the throttle pressure, as described later. The line pressure is supplied to the manual valve 4100 via a line pressure oil passage 4010.

The manual valve 4100 includes a drain port 4105. The hydraulic pressure in a D-range pressure oil passage 4102 and the hydraulic pressure in an R-range pressure oil passage 4104 are discharged through the drain port 4105. When the spool of the manual valve 4100 is at the position D, communication is provided between the line pressure oil passage 4010 and the D-range pressure oil passage 4102, and thus, the hydraulic pressure is supplied to the D-range pressure oil passage 4102. At this time, communication is provided between the R-range pressure oil passage 4104 and the drain port 4105, and thus, the R-range pressure in the R-range pressure oil passage 4104 is discharged through the drain port 4105.

When the spool of the manual valve 4100 is at position R, communication is provided between the line pressure oil passage 4010 and the R-range pressure oil passage 4104, and thus, the hydraulic pressure is supplied to the R-range pressure oil passage 4104. At this time, communication is provided between the D-range pressure oil passage 4102 and the drain port 4105, and thus, the D-range pressure in the D-range pressure oil passage 4102 is discharged through the drain port 4105.

When the spool of the manual valve 4100 is at the position N, communication is provided between the D-range pressure oil passage 4102 and the drain port 4105, and between the R-range pressure oil passage 4104 and the drain port 4105. Thus, the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is finally supplied to the B1 brake 3610, B2 brake 3620, C1 clutch 3640, and C2 clutch 3650. The hydraulic pressure supplied to the R-range pressure oil passage 4104 is finally supplied to the B2 brake 3620.

The solenoid modulator valve 4200 regulates the line pressure, which is the source pressure, to the constant solenoid modulator pressure to be supplied to the SLT 4300.

The SL (1) 4210 regulates a hydraulic pressure to be supplied to the C1 clutch 3640. The SL (2) 4220 regulates a hydraulic pressure to be supplied to the C2 clutch 3650. The SL (3) 4230 regulates a hydraulic pressure to be supplied to the B1 brake 3610. The SL (4) 4240 regulates a hydraulic pressure to be supplied to the B3 brake 3630.

The SLT 4300 regulates the solenoid modulator pressure, which is the source pressure, to the throttle pressure according to a control signal from the ECU 8000. The ECU 8000 transmits the control signal based on the accelerator-pedal operation amount detected by the accelerator-pedal operation amount sensor 8010. The throttle pressure is supplied to the primary regulator valve 4006 via an SLT oil passage 4302. The throttle pressure is used as the pilot pressure for the primary regulator valve 4006.

The SL (1) 4210, SL (2) 4220, SL (3) 4230, SL (4) 4240, and SLT 4300 are controlled by the control signals transmitted from the ECU 8000.

The B2 control valve 4500 selectively supplies the hydraulic pressure in the D-range pressure oil passage 4102 or the hydraulic pressure in the R-range pressure oil passage 4104 to the B2 brake 3620. The B2 control valve 4500 is connected to the D-range pressure oil passage 4102 and the R-range pressure oil passage 4104. The B2 control valve 4500 is controlled by the hydraulic pressure supplied from an SL solenoid valve (not shown) and the hydraulic pressure supplied from an SLU solenoid valve (not shown), and the impelling force of a spring.

When the SL solenoid valve is off, and the SLU solenoid valve is on, the B2 control valve 4500 is in the state as shown in the left half of the B2 control valve 4500 in FIG. 4. In this case, the B2 control valve 4500 is operated by the hydraulic pressure supplied from the SLU solenoid valve, which functions as the pilot pressure. Thus, the B2 control valve 4500 regulates the D-range pressure, and supplies the regulated D-range pressure to the B2 brake 3620.

When the SL solenoid valve is on, and the SLU solenoid valve is off, the B2 control valve 4500 is in the state as shown in the right half of the B2 control valve 4500 in FIG. 4. In this case, the B2 control valve 4500 supplies the R-range pressure to the B2 brake 3620.

Figure 5:
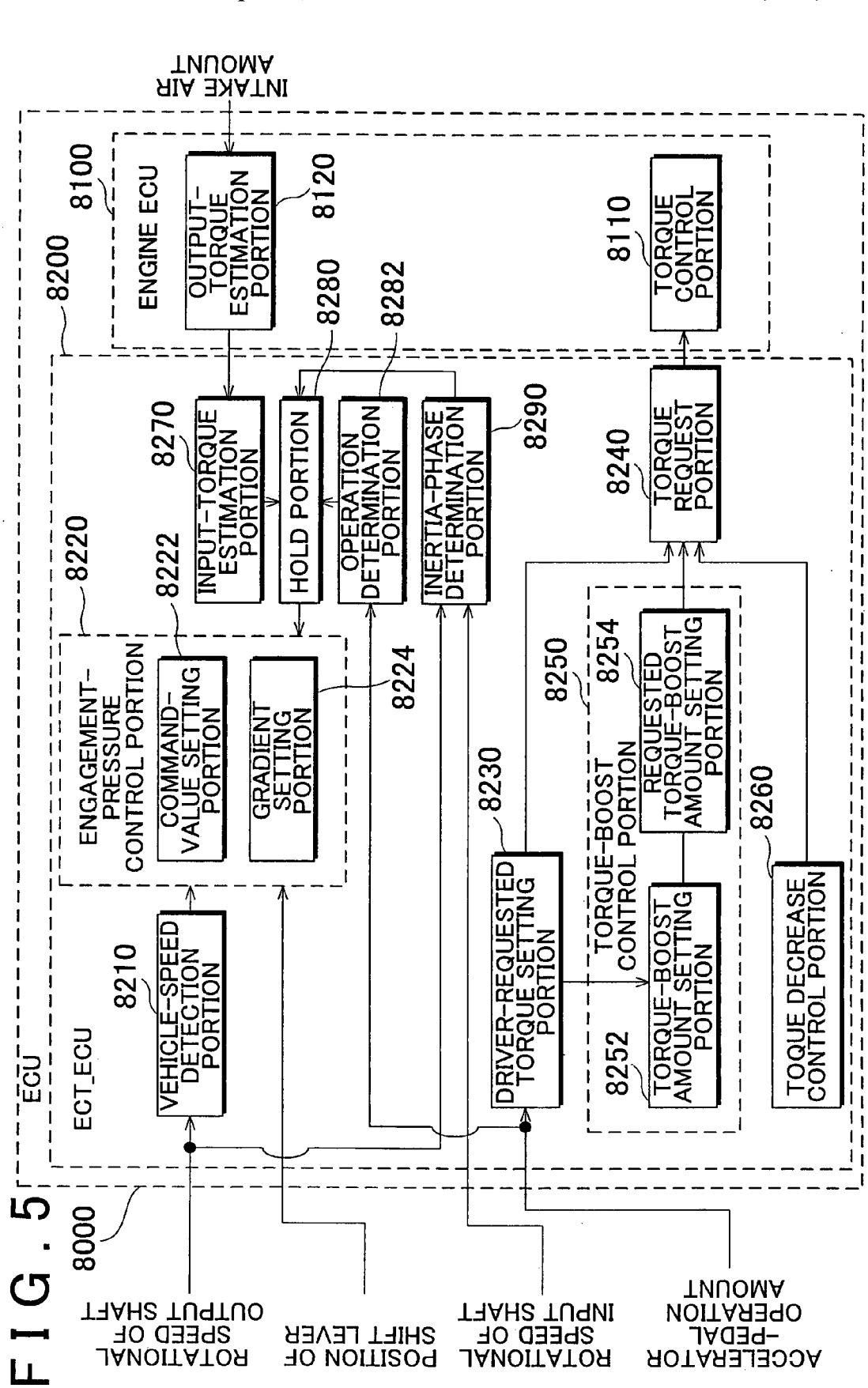
FIG. 5 is a function block diagram showing an ECU according to a first embodiment of the invention.

The ECU 8000 will be further described with reference to FIG. 5. The function of the ECU 8000 described below may be implemented through hardware or software.

The engine ECU 8100 of the ECU 8000 includes a torque control portion 8110, and an output-torque estimation portion 8120. The torque control portion 8110 receives the signal that indicates the requested torque amount from the ECT_ECU 8200. Then, the torque control portion 8110 controls the opening amount of the electronic throttle valve 8016 and the timing at which an ignition plug ignites air-fuel mixture so that the actual torque output from the engine 1000 is equal to the requested torque amount.

The output-torque estimation portion 8120 estimates the torque output from the engine 1000, based on the amount of intake air detected by the airflow meter 8002. As the method of estimating the torque output from the engine 1000, a known ordinary technology may be used. Therefore, the detailed description thereof will be omitted. The torque estimated by the output-torque estimation portion 8120 is input to the ECT_ECU 8200.

The ECT_ECU 8200 of the ECU 8000 includes a vehicle-speed detection portion 8210, an engagement-pressure control portion 8220, a driver-requested torque setting portion 8230, a torque request portion 8240, a torque-boost control portion 8250, a torque decrease control portion 8260, an input-torque estimation portion 8270, a hold portion 8280, an operation determination portion 8282, and an inertia-phase determination portion 8290.

The vehicle-speed detection portion 8210 calculates (detects) the vehicle speed based on the rotational speed NO of the output shaft of the automatic transmission 2000. The engagement-pressure control portion 8220 controls the engagement pressures for the B1 brake 3610, B2 brake 3620, B3 brake 3630, C1 clutch 3640, and C2 clutch 3650 during the gear shift, and after the gear shift ends.

Figure 6:
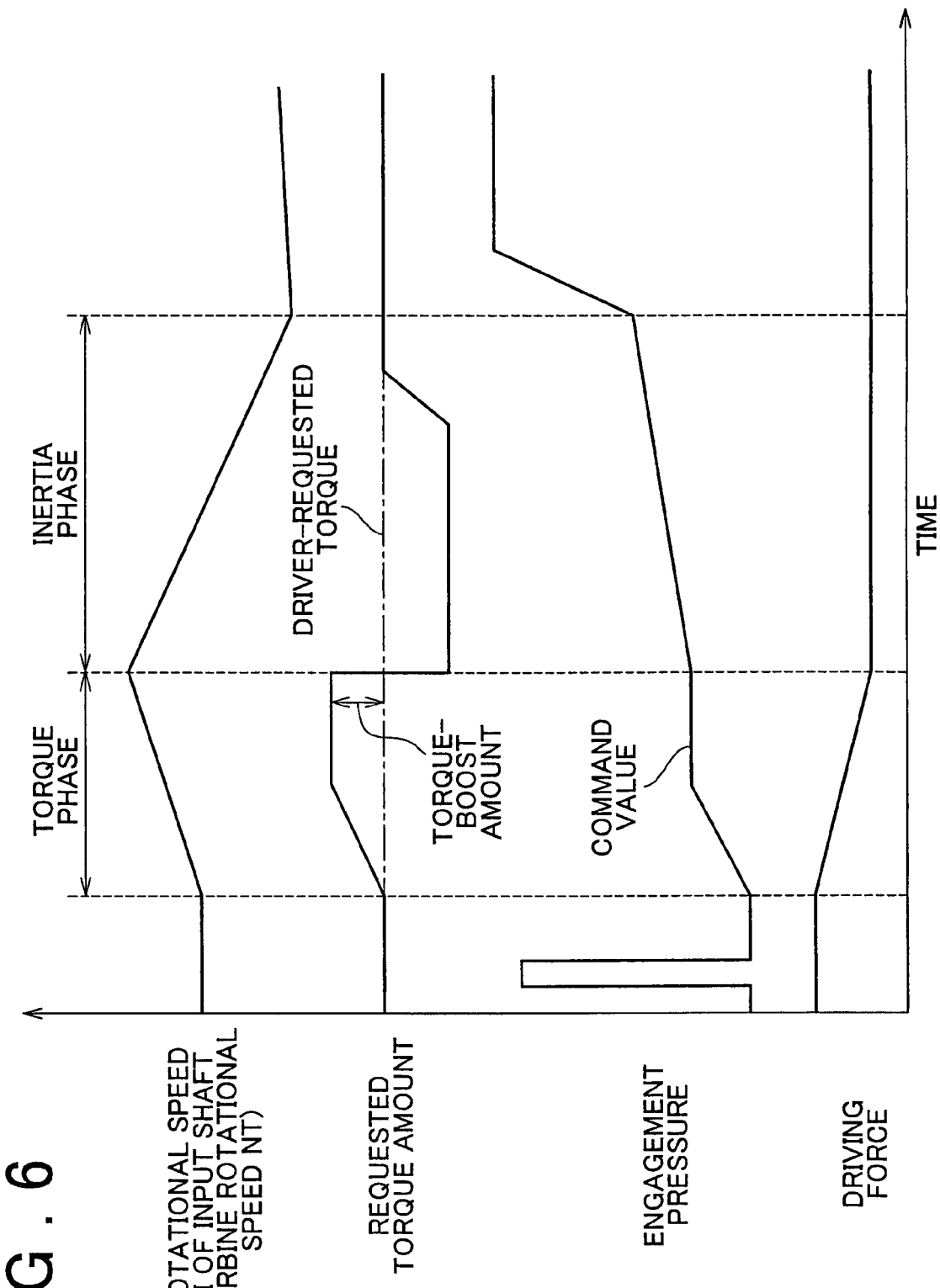
FIG. 6 is a timing chart showing changes in a requested torque amount and an engagement pressure according to the first embodiment of the invention.

The engagement-pressure control portion 8220 includes a command-value setting portion 8222, and a gradient setting portion 8224. The command-value setting portion 8222 sets the command value of the engagement pressure for a friction engagement element to be engaged when the automatic transmission 2000 shifts (upshifts). More specifically, the command-value setting portion 8222 sets the command value used during the torque phase, based on parameters, that is, the combination of gears selected before and after the upshift, and the value of torque input to the automatic transmission 2000 (hereinafter, will be sometimes referred to as "input torque value"), which is held (stored) by the hold portion 8280, as shown in FIG. 6. The hold portion 8280 may be regarded as the input-torque storage portion according to the invention.

The gradient setting portion 8224 sets the gradient of the engagement pressure for the friction engagement element to be engaged when the automatic transmission 2000 shifts (upshifts). More specifically, the gradient setting portion 8224 sets the gradient used to gradually increase the engagement pressure for the friction engagement element during the inertia phase, based on the parameters, that is, the combination of the gears selected before and after the gear shift, and the value of the torque input to the automatic transmission 2000, which is held by the hold portion 8280, as shown in FIG. 6. The gradient is set to increase as the held input torque value increases. Instead of the gradient, a target value of the engagement pressure may be set to increase as the input torque value increases.

The driver-requested torque setting portion 8230 sets a driver-requested torque based on the accelerator-pedal operation amount, and the like. The driver-requested torque is the torque requested by the driver. As the accelerator-pedal operation amount increases, the driver-requested torque increases.

The torque request portion 8240 sets the requested torque amount based on the driver-requested torque, and the like. The requested torque amount is the torque required of the engine 1000. For example, when the automatic transmission 2000 is not shifting, and accordingly the vehicle is steadily moving, the requested torque amount is set to the driver-requested torque.

The torque-boost control portion 8250 executes the torque-boost control to boost the torque during the torque phase when the automatic transmission 2000 upshifts. The torque-boost control portion 8250 includes a torque-boost amount setting portion 8252 and a requested torque-boost amount setting portion 8254.

The torque-boost amount setting portion 8252 sets a torque-boost amount, which is the amount by which the torque output from the engine 1000 needs to be boosted, of the torque-boost control. The torque-boost amount is set based on the driver-requested torque, that is, the accelerator-pedal operation amount.

The requested torque-boost amount setting portion 8254 sets a requested torque-boost amount to increase the torque output from the engine 1000 by the torque-boost amount in a predetermined manner during the torque phase when the automatic transmission 2000 upshifts. That is, the requested torque-boost amount gradually increases, and finally reaches the torque-boost amount.

When the torque-boost control is executed, the torque request portion 8240 sets the requested torque amount to the sum of the requested torque-boost amount and the driver-requested torque, as shown by the solid line in FIG. 6.

The torque decrease control portion 8260 executes a torque decrease control that decreases the torque during the inertia phase when the automatic transmission 2000 upshifts. During the torque decrease control, the torque decrease control portion 8260 sets a requested torque to decrease the torque to a predetermined value lower than the driver-requested torque after the inertia phase starts.

During the torque decrease control, the torque request portion 8240 sets the requested torque amount to the requested torque set by the torque decrease control portion 8260, as shown by the solid line in FIG. 6.

The input-torque estimation portion 8270 estimates the value of the torque input to the automatic transmission 2000, based on the output torque estimated by the output-torque estimation portion 8120 of the engine ECU 8100, and the torque ratio of the torque converter 3200. As the method of estimating the value of the torque input to the automatic transmission 2000, a known ordinary technology may be used. Therefore, the detailed description thereof will be omitted.

The hold portion 8280 holds (stores) the value of the torque input to the automatic transmission 2000 during the inertia phase. The hold portion 8280 holds, as the input torque value, a first input torque value that is estimated when it is determined that the inertia phase has started. When the accelerator pedal 8008 has been operated by at least a predetermined amount to increase the accelerator-pedal operation amount (i.e., when the accelerator pedal 8008 has been operated so that the amount of change in the accelerator-pedal operation amount is equal to or greater than a threshold value), the hold portion 8280 holds, as a new input torque value, a value determined based on a second input torque value, which is the value of the torque estimated at the time point, and the first input torque value. That is, the hold portion 8280 updates the input torque value to the determined value.

If the second input torque value, which is estimated when the hold portion 8280 should hold a new input torque value (i.e., the hold portion 8280 should update the input torque value to a new input torque value), that is, when the accelerator pedal 8008 has been operated by at least the predetermined amount to increase the accelerator-pedal operation amount, is smaller than the first input torque value that is held, the hold portion 8280 makes the second input torque value equal to the first input torque value, and holds, as a new input torque value, the second input torque value that is equal to the first input torque value.

The operation determination portion 8282 determines whether the accelerator pedal 8008 has been operated by at least the predetermined amount to increase the accelerator-pedal operation amount. The inertia-phase determination portion 8290 determines whether the inertia phase has started. The inertia-phase determination portion 8290 determines that the inertia phase has started, when the rotational speed NI of the input shaft of the automatic transmission 2000 is lower than a value obtained by multiplying the rotational speed NO of the output shaft of the automatic transmission 2000 by the gear ratio of the gear selected before the gear shift (upshift) starts. The method of determining whether the inertia phase has started is not limited to this method.

Figure 7:
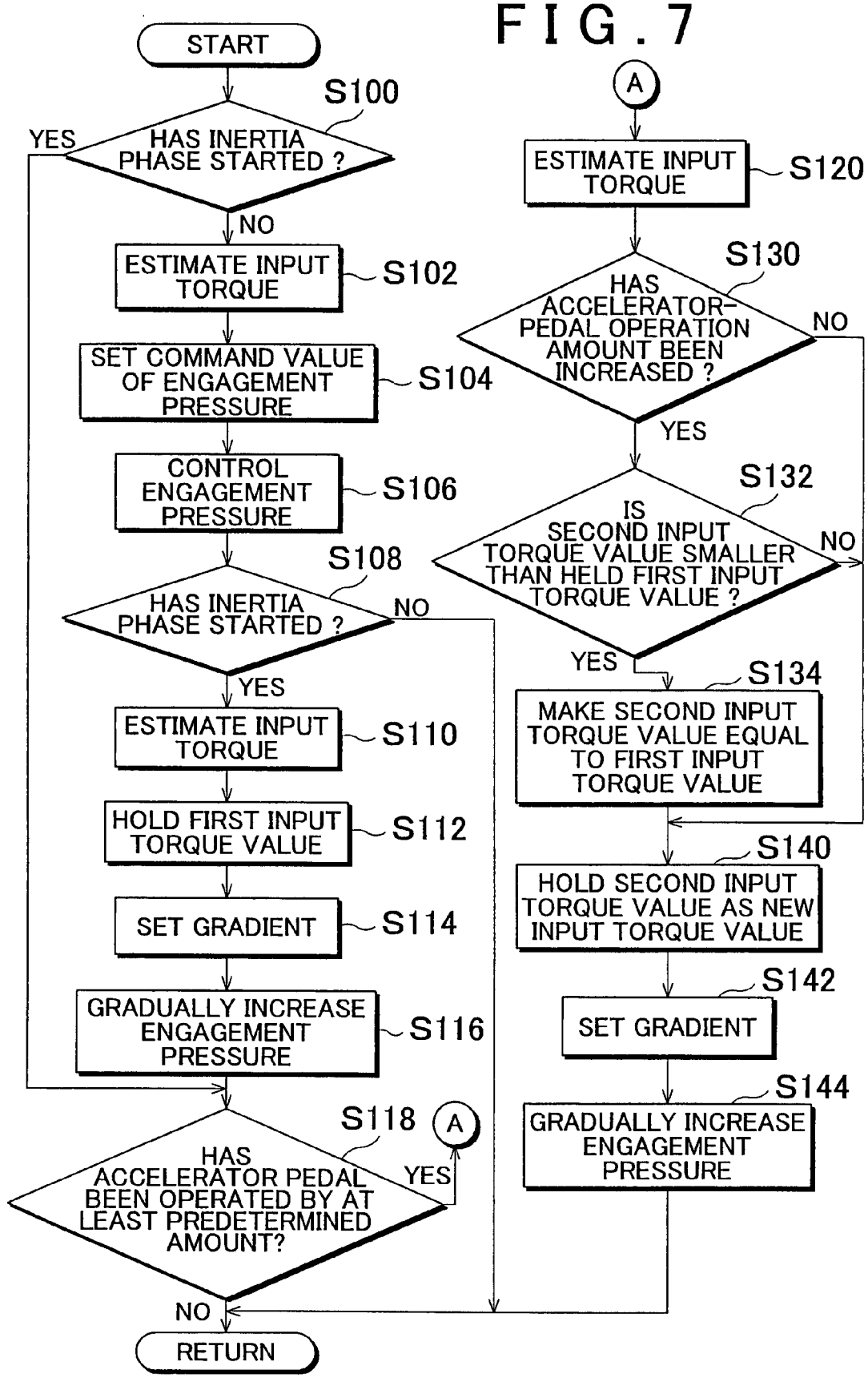
FIG. 7 is a flowchart showing a routine executed by the ECU that is the control apparatus according to the first embodiment of the invention.

The routine executed by the ECU 8000 when the automatic transmission 2000 upshifts will be described with reference to FIG. 7. The ECU 8000 is the control apparatus according to this embodiment. The routine described below is periodically executed at predetermined time intervals.

In step S100, the ECU 8000 determines whether the inertia phase has started. When the inertia phase has not started (NO in step S100), the routine proceeds to step S102. When the inertia phase has started (YES in step S100), the routine proceeds to step S1118.

In step S102, the ECU 8000 estimates the value of the torque input to the automatic transmission 2000, that is, the input torque value. In step S104, the ECU 8000 sets the command value of the engagement pressure for the friction engagement element to be engaged when the automatic transmission 2000 upshifts. The command value is used during the torque phase.

In step 106, the ECU 8000 controls the engagement pressure for the friction engagement element to be engaged when the automatic transmission 2000 upshifts so that the engagement pressure is equal to the set command value during the torque phase.

In step S108, the ECU 8000 determines whether the inertia phase has started. When the inertia phase has started (YES in step S108), the routine proceeds to step S110. When the inertia phase has not started (NO in step S108), the routine ends.

In step S110, the ECU 8000 estimates the first value of the torque input to the automatic transmission 2000, that is, the first input torque value. In step S112, the ECU 8000 holds the first input torque value.

In step S114, the ECU 8000 sets the gradient used to gradually increase the engagement pressure during the inertia phase, based on the first input toque value that is held. In step S116, the ECU 8000 gradually increases the engagement pressure at the set gradient.

In step S118, the ECU 8000 determines whether the accelerator pedal 8008 has been operated by at least the predetermined amount, that is, whether the amount of change in the accelerator-pedal operation amount is equal to or greater than the threshold value. When the accelerator pedal 8008 has been operated by at least the predetermined amount (YES in step S118), the routine proceeds to step S120. When the accelerator pedal 8008 has not been operated by an amount equal to or greater than the predetermined amount (NO in step S118), the routine ends.

In step S120, the ECU 8000 estimates the second value of the torque input to the automatic transmission 2000, that is, the second input torque value.

In step S130, the ECU 8000 determines whether the accelerator-pedal operation amount has been increased. When the accelerator-pedal operation amount has been increased (YES in step S130), the routine proceeds to step S132. When the accelerator-pedal operation amount has not been increased (NO in step S130), the routine proceeds to step S1140.

In step S132, the ECU 8000 determines the second input torque value (estimated input torque value) is smaller than the first input torque value that is held. When the second input torque value is smaller than the first input torque value that is held (YES in step S132), the routine proceeds to step S134. When the second input torque value is equal to or greater than the first input torque value that is held (NO in step S1132), the routine proceeds to step S140.

In step S134, the ECU 8000 makes the second input torque value equal to the first input torque value that is held. In step S140, the ECU 8000 holds, as the new input torque value, the second input torque value that is equal to the first input torque value. In step S142, the ECU 8000 sets the gradient used to gradually increase the engagement pressure during the inertia phase, based on the second input torque value that is held. In step S144, the ECU 8000 gradually increases the engagement pressure at the set gradient.

The operation of the ECU 8000 based on the above-described structure and flowchart will be described. The ECU 8000 is the control apparatus according to this embodiment.

When the automatic transmission 2000 upshifts, and the inertia phase has not started (NO in step S100), the value of the torque input to the automatic transmission 2000, that is, the input torque value is estimated (S102). Based on the estimated input torque value, the command value of the engagement pressure for the friction engagement element to be engaged when the automatic transmission 2000 upshifts is set (S104). The command value is used during the torque phase. As shown in FIG. 6, the engagement pressure is controlled so that the engagement pressure is equal to the command value during the torque phase (S106).

When the inertia phase has started (YES in step S108), the first value of the torque input to the automatic transmission 2000, that is, the first input torque value is estimated (S110). The first input torque value is held (S112).

Based on the first input torque value that is held, the gradient used to gradually increase the engagement pressure during the inertia phase is set (S114). As shown in FIG. 6, the engagement pressure is gradually increased at the set gradient (S116).

When the inertia phase has started (YES in step S100), and the accelerator pedal 8008 has been operated by at least the predetermined amount (YES in step S118), the second value of the toque input to the automatic transmission 2000, that is, the second input torque value is estimated (S120). Then, it is determined whether the accelerator-pedal operation amount has been increased (S130).

As shown in FIG. 6, the torque decrease control is executed to decrease the torque output from the engine 1000 during the inertia phase. Therefore, even when the accelerator-pedal operation amount has been increased, the second input torque value may be smaller than the first input torque value that is estimated when the inertia phase has started.

If the engagement pressure is decreased based on the second input torque value that is smaller than the first input torque value, the gear shift is slowly performed. In this case, although the driver requests acceleration, the vehicle is unlikely to accelerate, because the gear shift has not ended.

Accordingly, when the accelerator-pedal operation amount has been increased (YES in step S130), it is determined whether the second input torque value is smaller than the first input torque value that is held (S132).

When the second input torque value is smaller than the first input torque value that is held (YES in step S132), the second input torque value is made equal to the first input torque value (S134), and the second input torque value that is equal to the first input torque value is held as a new input torque value (S140).

This reduces the possibility that the held input torque value decreases. Based on the second input torque value that is held in the above-described manner, the gradient used to gradually increase the engagement pressure during the inertia phase is set (S142). Then, the engagement pressure is gradually increased at the set gradient (S144). This reduces the possibility that the engagement pressure is unnecessarily decreased. Therefore, it is possible to reduce the possibility that the gear shift is slowly performed.

When the accelerator-pedal operation amount has been decreased (NO in step S130), it is determined that the driver requests a decrease in the torque output from the engine 1000. Accordingly, even if the second input torque value is smaller than the first input torque value estimated when the inertia phase has started, no problem occurs.

Thus, when the accelerator-pedal operation amount has been decreased (NO in step S130), the second input torque value, which has not been changed, is held as a new input torque value (S140). As a result, it is possible to hold the input torque value that is determined taking the driver's request into account.

As described above, the ECU, which is the control apparatus according to the embodiment, estimates the first value of the torque input to the automatic transmission, that is, the first input torque value when it is determined that the inertia phase has started, and holds the estimated first input torque value. When the accelerator pedal has been operated by at least the predetermined amount to increase the accelerator-pedal operation amount during the inertia phase, the ECU holds, as a new input torque value, the value determined based on the second input torque value estimated at the time point, and the first input torque value. More specifically, when the second input torque value is smaller than the first input torque value that is held, the ECU makes the second input torque value equal to the first input torque value, and holds, as a new input torque value, the second input torque value that is equal to the first input torque value. This reduces the possibility that the held input torque value decreases. Based on the second input torque value that is held in the above-described manner, the gradient used to gradually increase the engagement pressure during the inertia phase is set. Then, the engagement pressure is gradually increased at the set gradient. This reduces the possibility that the engagement pressure is unnecessarily decreased during the inertia phase. As a result, it is possible to reduce the possibility that the gear shift is slowly performed.

Hereinafter, a second embodiment of the invention will be described. The second embodiment differs from the first embodiment in that when the second input torque value is smaller than the first input torque value that is held, the second input torque value is made equal to a value that is greater than the held first input torque value by a predetermined value, and then the second input torque value is held as a new input torque value. The other portions have the same configuration and the same functions as in the first embodiment. Therefore, the detailed description thereof will be omitted.

When the second input torque value is smaller than the first input torque value, the hold portion 8280 of the ECT_ECU 8200 according to the embodiment makes the second input torque value equal to the value that is greater than the held first input torque value by the predetermined value, and then holds the second torque, as a new input torque value.

Figure 8:
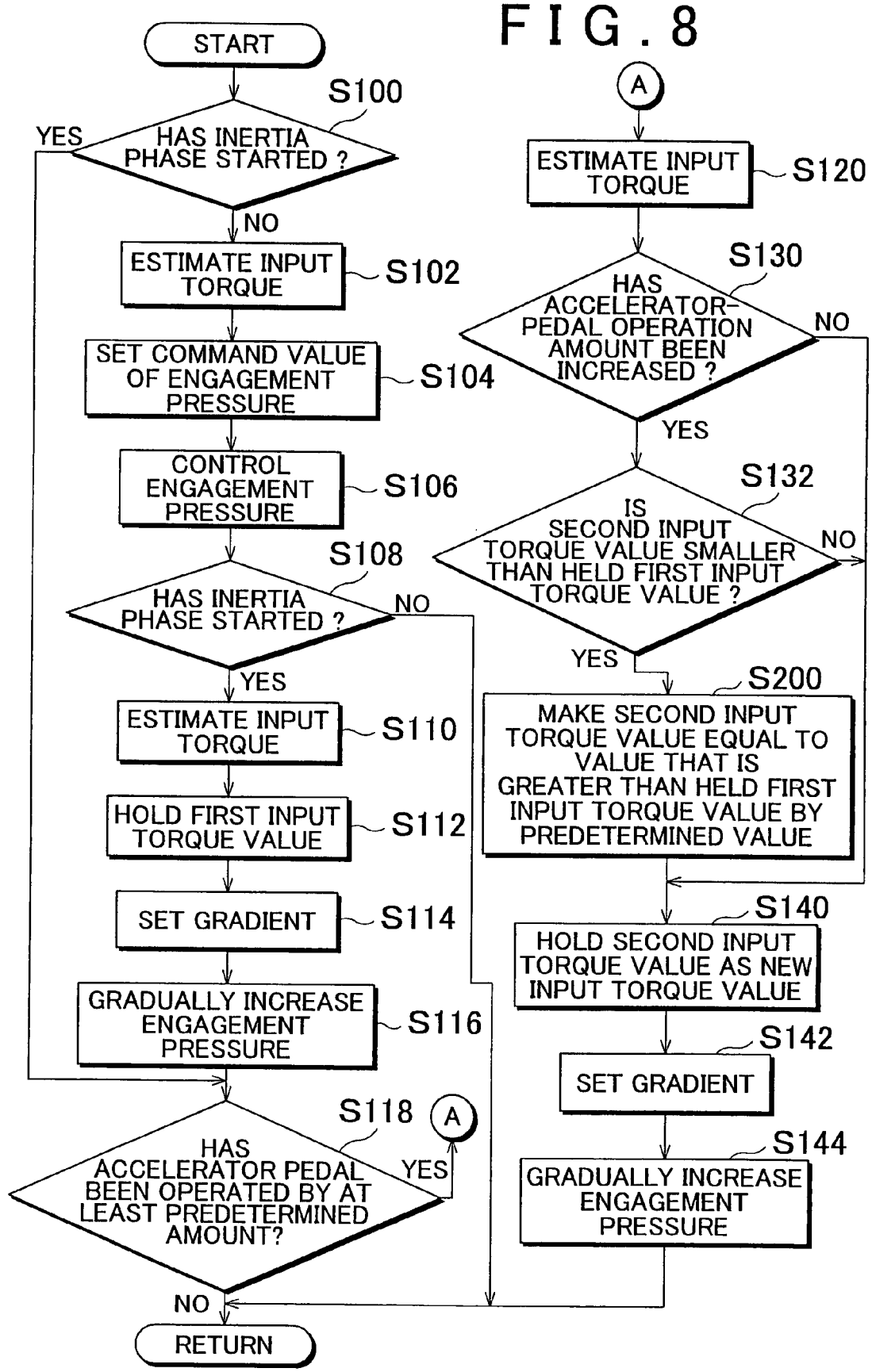
FIG. 8 is a flowchart showing a routine executed by an ECU that is a control apparatus according to a second embodiment of the invention.

The routine executed by the ECU 8000 will be described with reference to FIG. 8. The ECU 8000 is the control apparatus according to the embodiment. The routine described below differs from the routine in the first embodiment in that a process in step S200 is performed instead of the process in step S134. The other processes are the same as those in the routine in the first embodiment. Therefore, the description thereof will be omitted.

In step S200, the ECU 8000 makes the second input torque value equal to the value that is greater than the held first input torque value by the predetermined value.

Thus, the same effects as in the first embodiment are obtained. In addition, the input torque value is determined taking into account that the accelerator pedal has been operated.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a vehicle that includes a power source, and an automatic transmission connected to the power source, in which a gear is selected from among a plurality of gears with different gear ratios by selectively engaging a plurality of friction engagement elements, the control apparatus comprising:
   a torque-boost control portion that boosts torque output from the power source during a torque phase when the automatic transmission upshifts;
   an inertia-phase determination portion that determines whether an inertia phase has started when the automatic transmission upshifts;
   an operation determination portion that determines whether an accelerator pedal has been operated by at least a predetermined amount;
   a torque output decreasing portion that decreases the torque output from the power source during the inertia phase so that the torque output from the power source is lower than a required torque, the required torque being set to increase as an accelerator pedal operation amount increases;
   an input-torque estimation portion that estimates an input torque value that is a value of torque input to the automatic transmission;
   an input-torque storage portion that stores, as the input torque value, a first input torque value that is estimated when it is determined that the inertia phase has started, and then updates the input torque value to a value determined based on the first input torque value and a second input torque value that is estimated when it is determined that the accelerator pedal has been operated by at least the predetermined amount; and
   an engagement-pressure control portion that controls an engagement pressure for a friction engagement element to be engaged when the automatic transmission upshifts, based on the stored input torque value,
   wherein when the second input torque value is smaller than the first input torque value, the input-torque storage portion updates the stored input torque value to a value that is equal to or greater than the first input torque value, and when the second input torque value is equal to or greater than the first input torque value, the input-torque storage portion updates the stored input torque value to the second input torque value.

2. The control apparatus for the vehicle according to claim 1, wherein when the second input torque value is smaller than the first input torque value, the input-torque storage portion updates the stored input torque value to the first input torque value.

3. The control apparatus for the vehicle according to claim 1, wherein when the second input torque value is smaller than the first input torque value, the input-torque storage portion updates the stored input torque value to a value that is greater than the first input torque value by a predetermined value.

4. The control apparatus for the vehicle according to claim 1, wherein the engagement-pressure control portion sets a gradient used to gradually increase the engagement pressure during the inertia phase, based on the stored input torque value.

5. The control apparatus for the vehicle according to claim 4, wherein the engagement-pressure control portion sets the gradient such that the gradient increases as the stored input torque value increases.

6. The control apparatus for the vehicle according to claim 1, wherein the engagement-pressure control portion sets a target value of the engagement pressure, based on the stored input torque value.

7. The control apparatus for the vehicle according to claim 6, wherein the engagement-pressure control portion sets the target value of the engagement pressure such that the target value of the engagement pressure increases as the stored input torque value increases.

8. A control apparatus for a vehicle that includes a power source, and an automatic transmission connected to the power source, in which a gear is selected from among a plurality of gears with different gear ratios by selectively engaging a plurality of friction engagement elements, the control apparatus comprising:
   means for boosting torque output from the power source during a torque phase when the automatic transmission upshifts;
   means for determining whether an inertia phase has started when the automatic transmission upshifts;
   means for determining whether an accelerator pedal has been operated by at least a predetermined amount;
   means for decreasing the torque output from the power source during the inertia phase so that the torque output from the power source is lower than a required torque, the required torque being set to increase as an accelerator pedal operation amount increases;
   means for estimating an input torque value that is a value of torque input to the automatic transmission;
   input-torque storage means for storing, as the input torque value, a first input torque value that is estimated when it is determined that the inertia phase has started, and then updating the input torque value to a value determined based on the first input torque value and a second input torque value that is estimated when it is determined that the accelerator pedal has been operated by at least the predetermined amount; and means for controlling an engagement pressure for a friction engagement element to be engaged when the automatic transmission upshifts, based on the stored input torque value, wherein when the second input torque value is smaller than the first input torque value, the input-torque storage means updates the stored input torque value to a value that is equal to or greater than the first input torque value, and when the second input torque value is equal to or greater than the first input torque value, the input-torque storage means updates the stored input torque value to the second input torque value.

* * * * *